Figure 1:
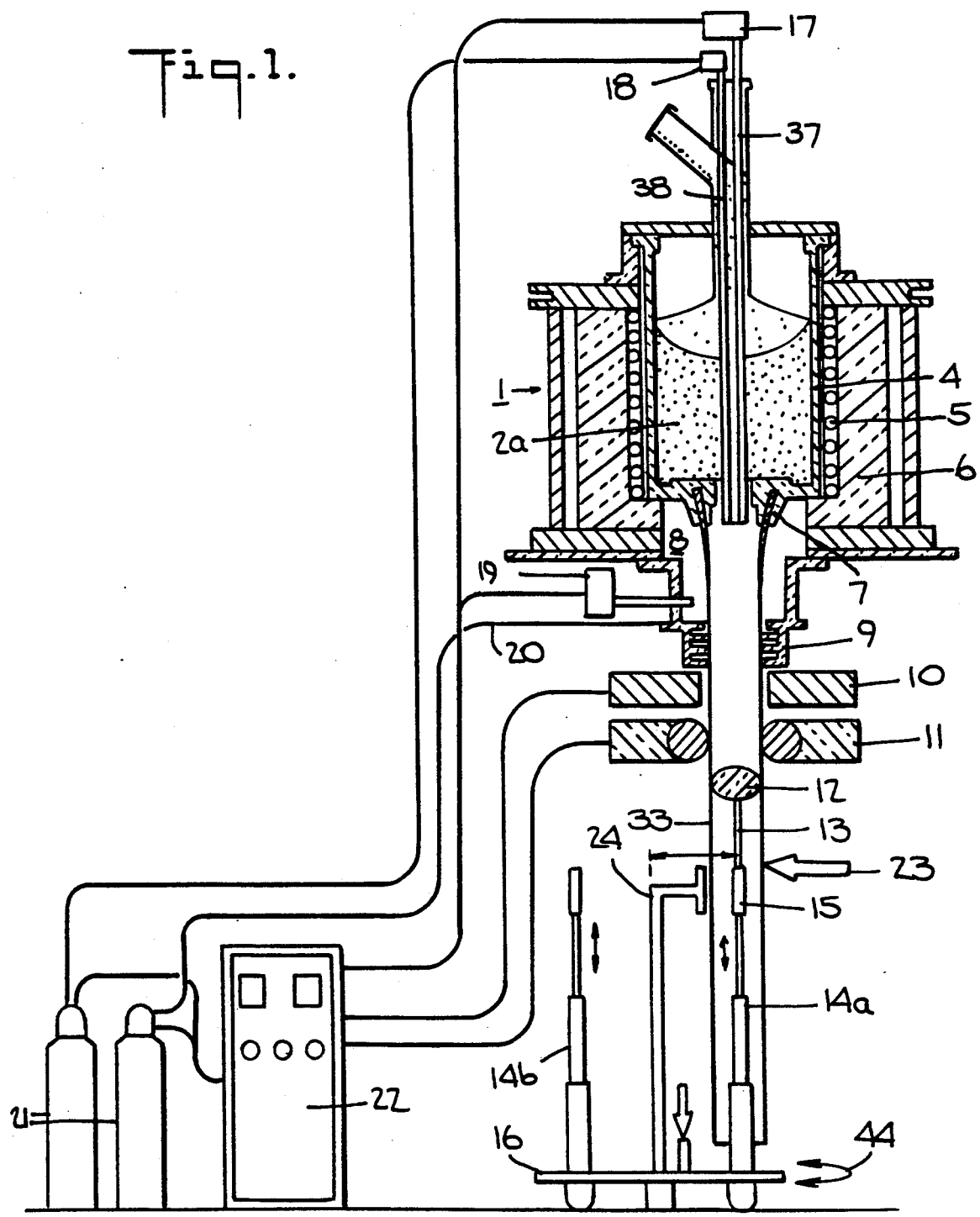

United States Patent [19]

Lebert et al.

[11] Patent Number: 5,026,413
[45] Date of Patent: Jun. 25, 1991

[54] PROCESS FOR MANUFACTURING QUARTZ GLASS PIPES HAVING A HIGH CONTENT OF SILICA WITH ONLY MINOR DIAMETER DEVIATIONS

[75] Inventors: Helmut Lebert, Hanau; Nigel R. Whippey, Seligenstadt, both of Fed. Rep. of Germany

[73] Assignee: Heraeus Quarzglas GmbH, Hanau, Fed. Rep. of Germany

[21] Appl. No.: 510,453

[22] Filed: Apr. 17, 1990

[30] Foreign Application Priority Data

Apr. 27, 1989 [DE] Fed. Rep. of Germany ....... 3913875

[51] Int. Cl.$^5$ ............................................. C03B 15/14
[52] U.S. Cl. ........................................ 65/29; 65/87; 65/188; 65/191; 65/161
[58] Field of Search ........................... 65/86–89, 65/187, 191, 190, 29, 161

[56] References Cited

U.S. PATENT DOCUMENTS

| | | | |
|---|---|---|---|
| 2,150,017 | 3/1939 | Barnard | 65/29 |
| 2,396,254 | 3/1940 | Everett | 65/187 X |
| 3,190,739 | 6/1965 | Wilson | 65/86 X |
| 3,410,672 | 11/1968 | Lajarte | 65/86 X |
| 3,556,758 | 1/1971 | Andrews et al. | 65/29 X |
| 3,620,704 | 11/1971 | Gray | 65/86 |

FOREIGN PATENT DOCUMENTS

| | | |
|---|---|---|
| 506384 | 8/1930 | Fed. Rep. of Germany . |
| 671626 | 2/1939 | Fed. Rep. of Germany . |
| 1221771 | 7/1966 | Fed. Rep. of Germany . |
| 1945576 | 4/1970 | Fed. Rep. of Germany . |
| 2647154 | 2/1978 | Fed. Rep. of Germany . |
| 1066102 | 4/1967 | United Kingdom . |
| 8203070 | 3/1981 | World Int. Prop. O. . |

Primary Examiner—Robert L. Lindsay
Attorney, Agent, or Firm—Felfe & Lynch

[57] ABSTRACT

A process is described for manufacturing vertically withdrawn pipes from quartz glass or glasses having a high content of silica with only minor diameter deviation. In an electrically heated furnace, the initial material is heated up to the softening point. A pipe is formed in a deformation zone and is downwardly withdrawn. In this deformation zone, a constant pressure difference is maintained between the pressure in the pipe interior and the pressure in a chamber and/or heating chamber. The pressure is continuously measured and controlled so as to be at a constant difference. In order to maintain a higher pressure in the pipe interior as opposed to the pressure in the chamber and/or the heating chamber, the withdrawn pipe end of the pipe to be manufactured is sealed.

7 Claims, 3 Drawing Sheets

PROCESS FOR MANUFACTURING QUARTZ GLASS PIPES HAVING A HIGH CONTENT OF SILICA WITH ONLY MINOR DIAMETER DEVIATIONS

The invention relates to a process for manufacturing vertically withdrawn pipes made of quartz glass or glasses having a high silicic acid content wherein the initial material is heated up to the softening point in an electrically heated furnace and a pipe is formed in a deformation zone and is downwardly withdrawn.

Processes of the aforesaid characterizing kind are known from German PS 67 16 26. In this process, quartz granules are heated up to softening temperature in an electrically heated furnace which includes a melting vessel enclosed by an electrically heated casing. The so treated granules are then downwardly withdrawn into a pipe mold. In the deformation zone the pipe, at its inside as well as its outside, is exposed to a protective gas. After drawing the pipe to the desired length, it is cut off. The so manufactured quartz glass pipes exhibit a uniform wall thickness, they are free of bubbles and are transparent. Deviations in the diameter of these pipes, however, cannot be avoided.

Today's manufacturing processes which are automated because of the numerous applications of quartz glass pipes require absolute precision and maintenance of narrow tolerances, particularly with regard to the pipe diameter.

Accordingly, it is an object of the invention to provide a process for manufacturing pipes of any desired length from quartz glass or glass having a high content of silicic acid, i.e. glasses with a $SiO_2$-content of at least 95 wt. -%. The pipes must have a prescribed diameter and wall thickness, particularly a wall thickness and a diameter constant over a prescribed pipe length, i.e. diameter deviations must be reduced to a minimum.

The object is accomplished for the above characterized process in accordance with the invention in that a constant pressure difference between the pressure in the pipe interior and the pressure in a chamber and/or heating chamber which encloses the pipe prevails in the deformation zone, in that the pressures in the pipe interior and the chamber and/or heating chamber are continuously measured and controlled so as to match this constant difference and in that the withdrawn pipe end is sealed in order to generate and maintain a pressure in the pipe interior which is higher than the pressure in the chamber and/or the heating chamber.

The constant pressure difference is advantageously maintained in that gas is supplied to the chamber and/or heating chamber and/or to the pipe interior. Using refractory metals like molybdenum or tungsten as a material for the heating elements or the melting crucible, it proved to be particularly good supplying a hydrogen-containing gas to the chamber and/or the heating chamber. In order to increase the pressure in the pipe interior as opposed to the pressure in the chamber and/or the heating chamber, the withdrawn pipe end is sealed with a solid, liquid or gaseous plug.

The process in accordance with the invention is suited not only for the manufacture of pipes from a granular basic material but also for the use of a hollow cylindrical body as an initial material. In the first case, it proved to be advantageous—as known from German PS 67 16 26, cited as prior art—to supply gas to the deformation zone in the pipe interior. In case a hollow-cylindrical initial body is used, a gas is also supplied in order to maintain a pressure in the pipe interior. Here, it is advantageous to gas-tight seal the one end of the hollow-cylindrical body which faces away from the deformation zone. The gas supplied must not necessarily contain hydrogen, it is also possible to use nitrogen or air. When using graphite heating elements, it is not absolutely necessary to rinse the heating chamber with a hydrogen-containing gas. Particularly good results with respect to maintaining narrow diameter tolerances can be achieved in accordance with the invention in that the deviations of the pressure difference between the pipe interior and the pressure in the chamber and/or the heating chamber are controlled to be at ±1 Pa.

The process in accordance with the invention permits manufacturing quartz glass pipes having a diameter of 25 mm and a wall thickness of 3 mm. The diameter thereof can be maintained constant up to 0.05 mm over a length of 2 m. The pressure difference in the deformation zone was kept constant at 190 ±1 Pa. Without the pressure control in accordance with the invention, there are significant pressure difference deviations in the deformation zone which can lead to diameter deviations of up to 0.2 mm for a pipe length of 2 m. The process in accordance with the invention proved to be particularly advantageous for the manufacture of quartz glass pipes of larger diameters, for example, 100 mm and more. For pipes of this kind, the diameter deviations could be reduced to 0.3 mm, at a maximum, for a pipe length of 2 m. Without the process in accordance with the invention, the diameter deviations amount to 2 mm and more for the same pipe length.

In accordance with the invention, a process for manufacturing vertically withdrawn pipes from at least one of quartz glass and glasses having a high content of silicic acid comprises heating initial material up to a softening point in an electrically heated furnace and forming a pipe in a deformation zone and downwardly withdrawing the pipe. The process also includes continuously measuring the pressures in an interior of the pipe and in at least one of a chamber and heating chamber enclosing the pipe. The process also includes controlling the aforesaid pressures so as to maintain, in the deformation zone, a constant pressure difference between the pressure in the interior of the pipe and the pressure in at least one of the chamber and heating chamber enclosing the pipe and including sealing an end of the withdrawn pipe to generate and maintain a pressure in the pipe interior which is higher than the pressure in the at least one of the chamber and the heating chamber.

For a better understanding of the invention, together with other and further objects thereof, reference is made to the following description, taken in connection with the accompanying drawings, and its scope will be pointed out in the appended claims.

Figure 2:
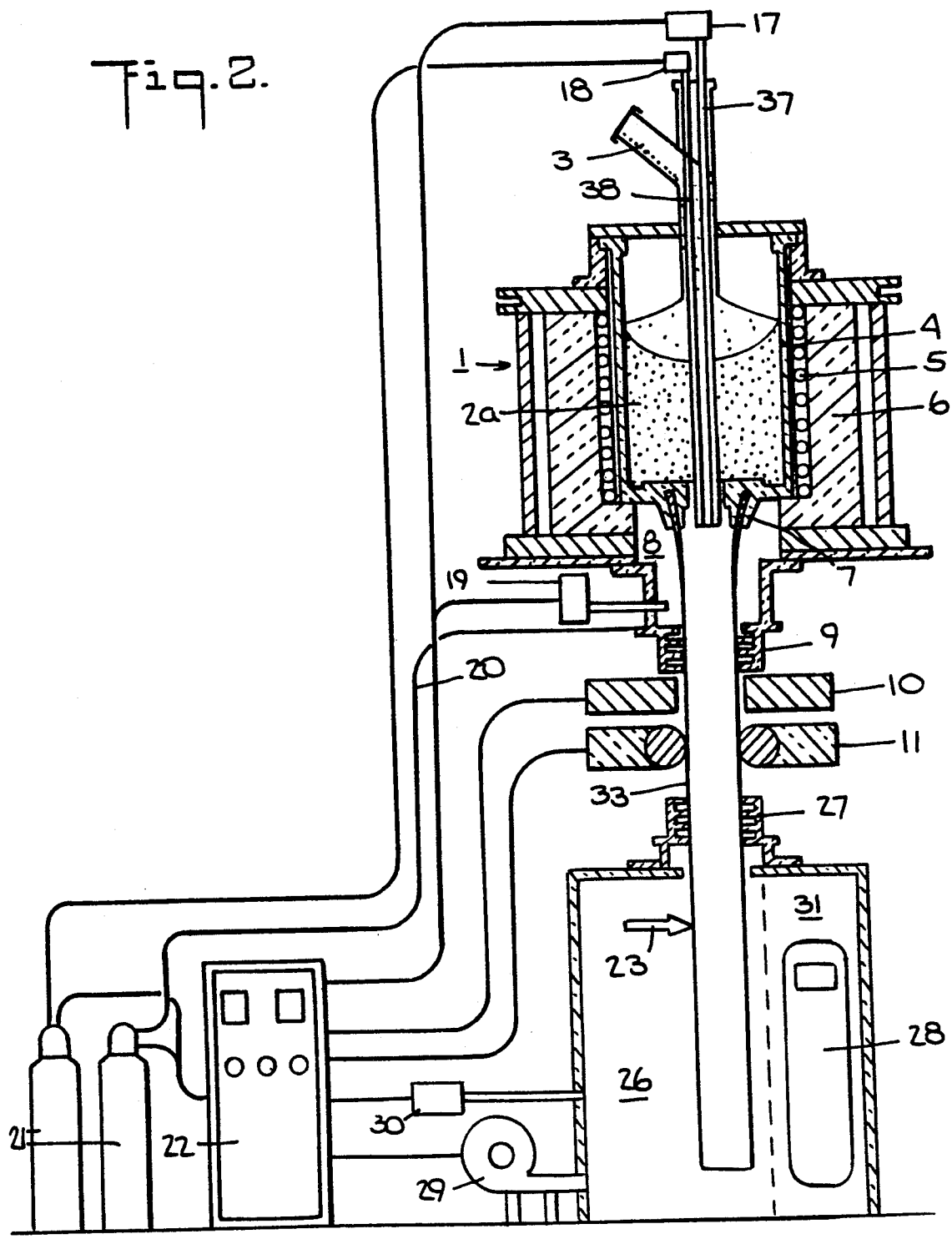
Figure 3:
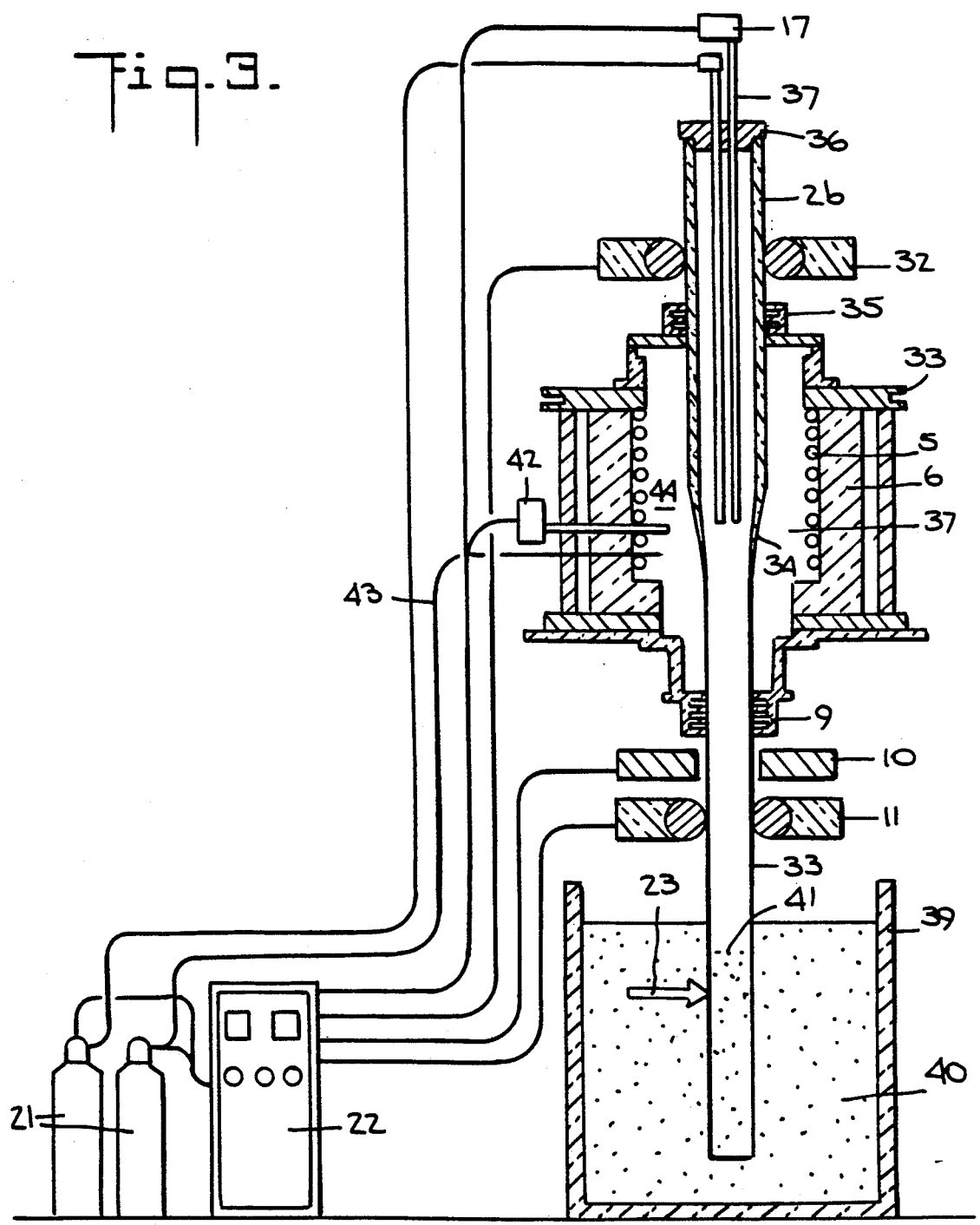

Referring now to the drawings:

FIGS. 1 to 3 diagrammatically represent devices for the working of the process in accordance with the invention.

The initial material for the quartz glass pipe in FIGS. 1 and 2 is quartz granules and in the embodiment of FIG. 3 a quartz hollow cylinder.

All of the embodiments for the working of this process which are represented in FIGS. 1 to 3 are based on the same teaching which states that in the deformation zone a constant pressure difference is maintained between the pipe interior and the pressure in chamber (FIGS. 1 and 2) and/or heating chamber (FIG. 3) which encloses the pipe and to which a protective gas is supplied. The pressures in the pipe interior and in the chamber and/or the heating chamber are continuously measured and controlled so as to maintain a constant difference. The withdrawn pipe end is sealed in order to generate and maintain a pressure in the pipe interior which is higher than the pressure in the chamber and/or in the heating chamber.

From FIG. 1 it can be seen that in the melting furnace 1, quartz granules 2a are used as an initial material which are supplied to the melting crucible 4 via an inlet funnel 3. The melting crucible 4, as known, is made of a refractory metal, for example molybdenum. By means of electric heating elements 5, the melting crucible 4 is heated up to a temperature such that the quartz granules are melting. The electric heating elements 5 are insulated toward the exterior by means of a thermal insulation 6. At the lower end of the melting crucible 4, there is a nozzle-like outlet 7 for the discharge of the quartz glass which has reached its softening point. The shape of the nozzle-like outlet 7 determines the geometry of the quartz glass pipe 33. The outlet extends into the interior of the chamber 8. At the bottom, i.e. in the direction in which the quartz glass pipe 33 is withdrawn, there is a discharge sluicegate 9 which is configured as system of diaphragms in this embodiment. Through this sluicegate, the quartz glass pipe which is withdrawn by means of the drawing device 11 is discharged the interior of the chamber 8. Between the drawing device 11 and the sluicegate 9, there is a measuring device 10 which detects the diameter of the withdrawn quartz glass pipe 33 as well as the wall thickness thereof. A commercially available laser-scanner, for example, can serve as such a measuring device. In its interior, the withdrawn quartz glass 33 has a sealing plug which, for example, can be an inflated, heat-resistant plastic body. This sealing plug 12 is supported by the support pipes 13 and 13a which are coupled to one another by an automatic snap closure 15. The sealing plug can be inflated via the compressed-air-terminal 25 and the support pipes 13 and 14a to correspond to the internal diameter of the withdrawn quartz glass pipe 33. Together with the terminal 25 for compressed air, the support pipes 13 and 14a are disposed on a rotary table 16 for conveying cut off quartz glass pipes. A cutting blade 23, which is disposed underneath the sealing plug, separates segments of quartz glass pipe from the withdrawn quartz glass pipe. After the pipe is lowered, the gripper 24 disposed on the rotary table picks up the coupling snap closure 15 such that the support pipe 14a can be telescopically introduced. A support pipe 14b is also disposed on the rotary table 16. After turning the table by 180°, as the arrow 44 indicates, the cut-off quartz glass pipe segment is, on the one hand, conveyed out of the area of the drawing device and, on the other side, the support device 14b takes over the place of the support device 14a below the drawing device. Subsequently, the snap closure couples it, via pipe 13, to the sealing plug 12 such that the sealing plug is secured again in its position. Subsequently, the arm of the gripper 24 is retracted and the quartz glass pipe segment which was cut off can be withdrawn from the rotary table.

A measuring device 17, the measuring pipe 37 of which extends into the deformation zone of the quartz glass pipe, is provided for determining the internal pressure. Via the gas supply 18, the gas supplied through the feed pipe 38 serves to change the pressure in the pipe interior in the deformation zone. The pressure in the chamber interior 8 can be measured by means of the chamber pressure measuring device 19. The gas feed line 20 which ends into the chamber 8 serves to adjust the pressure in the chamber interior 8. The gas supply 18 and the gas feed line 20, respectively, are connected to gas cylinders 21 which are filled with hydrogen or a hydrogen-containing gas. Corresponding to the desired diameter for the withdrawn quartz glass pipe, the control device 22 controls the pressure difference between the pressure P2 in the pipe interior and the pressure P1 in the chamber so as to remain at a constant value. Advantageously, the deviations of the pressure difference amounts to a maximum of ±1 Pa of the value selected. The diameter is monitored by the measuring device 10.

The device for the working of the process in accordance with the invention of FIG. 2 is essentially distinguished from the one in FIG. 1 in that the principle of the gaseous plug is applied rather than using a solid sealing plug for the withdrawn pipe. As it can be seen from FIG. 2, the withdrawn pipe enters the cutting chamber 26 which contains the cutting blade 23 via sluicegate 27. The cutting chamber 26 is connected to a ventilator 29 which maintains a prescribed pressure P3 inside the cutting chamber. This pressure is measured by means of the pressure measuring device 30 which in turn is connected to the control device 22. The latter in turn interacts with the ventilator and, hence, affects the pressure P3 in the cutting chamber 26. The pressure P3 in the cutting chamber is controlled such that the pressure P2 in the pipe interior of the deformation zone is maintained constant at a prescribed value. In the present case the pressure P3 in the cutting chamber is by approximately 130 Pa lower than the pressure P2 of the deformation zone and with increasing pipe length, it had to be decreased by approximately another 11 Pa/m. This amounts to a pressure change of approximately 22 Pa in the cutting chamber per 2 m pipe segment. Via sluicegate 31 and gate 28, the cut-off quartz glass segment is then discharged from the pressure chamber 26.

In the device of FIG. 3 for the working of the process in accordance with the invention, a hollow cylinder 2b is used as an initial material. Through an inlet sluicegate 35, an advance 32 continuously introduces this hollow cylinder 2b into the heating chamber 44 where it is heated up to the softening point by means of electric heating elements 5 and formed into the shape of a pipe which then is withdrawn via an outlet sluicegate 9 by means of a drawing device. The diameter and the wall thickness of the withdrawn pipe 33 are also measured and monitored by means of a measuring device such as a laser-scanner. The end of the quartz glass hollow cylinder which faces away from the deformation zone is gastight sealed by means of a plug 36. Through this plug, the measuring pipe 37 of the pressure gauge 17 as well as the feed line 38 of the gas supply 18 extend into the interior of the quartz glass hollow cylinder until they reach the deformation zone. The end of the withdrawn quartz glass pipe is withdrawn into a container 39 which is filled with a liquid 40, for example, water. Instead of water it is also possible to use silicone fluid. The liquid acts as a "liquid plug" and gastight closes the interior of the withdrawn quartz glass pipe 33 such that via the gas supply 18, a prescribed internal pressure can be selected and maintained in the pipe interior. In the heating chamber 44, the pressure is monitored via the pressure measuring device 42 and via the gas supply of the heating chamber 43, gas is supplied from one of the cylinders 21, if necessary. A cutting blade 23 cuts off segments of the quartz glass pipe 33 below the liquid level 41 in the quartz glass pipe 33. Otherwise, gas escapes from the interior of the withdrawn pipe and the pressure control in the pipe interior would be rendered ineffective. Adjustment, control and monitoring of the pressure difference in the deformation zone is carried out in the same way as described in connection with FIG. 1.

As it can be seen from FIGS. 1 and 2, drawing device 11 for the quartz glass pipe 33 is also connected with the control device 22. The measured values for diameter and wall thickness of the quarts glass pipe, which are recovered by the measuring device 10, the laser-scanner, are not only used for controlling the pressure difference which has to be maintained constant but it serves also to control the diameter and the wall thickness of the withdrawn quartz glass 33. The drawing speed is selected at the drawing device according to the desired pipe diameter and the wall thickness.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Process for manufacturing vertically withdrawn pipes from at least one of quartz glass and glasses having a high content of silica comprising:

heating initial material up to a softening point in an electrically heated furnace;

forming a pipe in a deformation zone and downwardly withdrawing the pipe including feeding gas into the interior of the pipe in the deformation zone;

continuously measuring the pressures in the interior of the pipe and in at least one of a chamber and heating chamber enclosing the pipe;

controlling said pressures in response to said measuring so as to maintain, in the deformation zone, a constant pressure difference between the pressure in the interior of the pipe and the pressure in at least one of the chamber and heating chamber enclosing the pipe and including sealing an end of the withdrawn pipe to maintain a pressure in the pipe interior which is higher than the pressure in the at least one of the chamber and the heating chamber.

2. Process in accordance with claim 1, in which the step of controlling the pressures comprises maintaining the constant pressure difference by supplying gas to at least one of the chamber and the heating chamber and the pipe interior.

3. Process in accordance with claim 1 in which sealing an end of the withdrawn pipe comprises sealing the withdrawn pipe end by one of a solid, gaseous and liquid plug.

4. Process in accordance with claim 1, in which a hollow cylindrical body is used as an initial material and in which sealing an end of the withdrawn pipe comprises gastight sealing an end of the body which faces away from the deformation zone.

5. Process in accordance with claim 1, in which a granular initial material is used and in which the step of controlling the pressures comprises supplying gas to the deformation zone in the pipe interior.

6. Process in accordance with claim 5, in which supplying gas comprises supplying a hydrogen-containing gas to the deformation zone in the pipe interior.

7. Process in accordance with claim 1, in which the step of controlling the pressures comprises controlling the deviations in the pressure difference between the pipe interior and the pressure in at least one of the chamber and the heating chamber to be $\pm 1$ Pa, at a maximum.

* * * * *

UNITED STATES PATENT AND TRADEMARK OFFICE
CERTIFICATE OF CORRECTION

PATENT NO. : 5,026,413

DATED : June 25, 1991

INVENTOR(S) : Leber et al

It is certified that error appears in the above-identified patent and that said Letters Patent is hereby corrected as shown below:

Title page, under UNITED STATES PATENT [19] and
   first line of [75] for "Lebert" read -- Leber --.

Signed and Sealed this

Twentieth Day of October, 1992

Attest:

DOUGLAS B. COMER

*Attesting Officer*      *Acting Commissioner of Patents and Trademarks*

UNITED STATES PATENT AND TRADEMARK OFFICE
CERTIFICATE OF CORRECTION

PATENT NO. : 5,026,413
DATED : June 25, 1991
INVENTOR(S) : Leber et al It is certified that error appears in the above-identified patent and that said Letters Patent is hereby corrected as shown below:

Column 1, line 23, "waIl" should read --wall--

Signed and Sealed this

Sixteenth Day of August, 1994

Attest:

BRUCE LEHMAN

Attesting Officer

Commissioner of Patents and Trademarks